Patented July 13, 1948

2,445,292

UNITED STATES PATENT OFFICE 2,445,292

VANILLYL ALCOHOL-FORMALDEHYDE RESINS

Harry F. Lewis and Irwin A. Pearl, Appleton, Wis., assignors, by mesne assignments, to Sulphite Products Corporation, Appleton, Wis., a corporation of Wisconsin No Drawing. Application May 17, 1944, Serial No. 536,038

4 Claims. (Cl. 260—53)

Our invention relates to the utilization of vanillyl alcohol and various polymerized products derived therefrom.

In co-pending application of Irwin A. Pearl, Serial No. 536,043 filed May 17, 1944, now Patent No. 2,414,120, there is disclosed the derivation of substantially unpolymerized vanillyl alcohol from vanillin. In co-pending application of Irwin A. Pearl, Serial No. 536,040, filed May 17, 1944, now abandoned, there is disclosed a variety of polymerized products derivable from vanillyl alcohol, and, as disclosed therein, produced in connection with the simultaneous manufacture of vanillic acid. These polymers include the compound dihydroxy-dimethoxydiphenylmethane which may or may not be further polymerized, depending upon the conditions under which it is produced.

We have discovered that plastic products of particular desirability may be produced from either unpolymerized vanillyl alcohol, or a partially polymerized product produced in connection with vanillic acid manufacture. Specifically, resins may be prepared which will make up into commercial plastics which are opaque with only a slight tan coloration, which can be made light enough to permit a wide variety of colors, such as reds, blues, greens, etc., to be secured by adding suitable pigments.

One example of a resin according to the invention is as follows:

Example I

A mixture of 550 parts of crude polymerized vanillyl alcohol, such as that produced by the procedure of co-pending application of Irwin A. Pearl, Serial No. 536,040 filed May 17, 1944 with 225 parts of 37% Formalin, and 25 parts of 50% phosphoric acid was stirred together and heated. When the temperature reached 45° C., the lumpy mixture became homogeneous and very viscous. Heating was continued to raise the temperature gradually to 87–90° C., and to maintain it there for three hours.

The light tan colored mixture was then allowed to cool, and when cold, became very hard and brittle, with a yield of 589 parts of resin, in which the tackiness of the original vanillyl alcohol had completely disappeared.

Substantially identical resin products can be prepared from unpolymerized vanillyl alcohol from any source. To secure identical proportions between the alcohol and the formaldehyde there should be a slight increase in the weight of the alcohol compared with the weight of polymerized alcohol. Exact control can be secured in this respect by determining the methoxyl content of the different products employed, holding the ratio of methoxyl to formaldehyde constant.

Briefly, vanillyl alcohol suitable for the foregoing example may be produced as follows:

One weight atom of silver precipitate is boiled for two hours in an aqueous solution containing 5.0 mole of sodium hydroxide and one mole of vanillin.

The solution is filtered to separate the silver, and the filtrate acidified with sulfur dioxide and extracted with ether (or other organic solvent). This ether extract contains both the vanillic acid and the polymerized vanillyl alcohol products, which are easily separated by extracting the ether with 8% sodium bicarbonate solution, which will extract the vanillic acid and leave the polymerized alcohol in the ether.

Acidification of the sodium bicarbonate solution secures the vanillic acid as a precipitate, and removal of the organic solvent by distillation secures the polymerized alcohol portion.

The yield is substantially 0.5 mole of vanillic acid, and the amount of polymerized vanillyl alcohol is slightly less than 0.5 mole by reason of the fractional loss of weight due to polymerization. However, analysis of the polymerized portion of the product gives an amount of methoxyl which is the full equivalent of the 0.5 mole of alcohol.

Alternatively, the vanillyl alcohol may be produced as follows:

24 parts (0.6 mole) of sodium hydroxide and 21 parts (0.2 weight atom) of catalytic silver, were subjected to intense mechanical mixing in 200 parts of water, while a slurry made up of 15.2 parts (0.1 mole) of vanillin and 50 parts (0.5 mole) of 37% Formalin solution were added a little at a time. Mixing was continued for about thirty minutes. No heat was added but the temperature rose, at first slowly and then more rapidly, to near the boiling point.

The reaction mass was filtered, acidified with carbon dioxide, saturated with sodium chloride, and extracted with ether to secure 12.7 parts of vanillyl alcohol which was found to be entirely monomeric and unpolymerized and represented 82.5% of the original vanillin.

From the resin of Example I, it is possible to prepare desirable mixtures for the production of plastic articles, using ingredients. One such mixture is as follows:

Example II

| | Parts |
|---|---|
| Resin according to Example I | 100 |
| White pine flour | 100 |
| Boric acid | 10 |
| Mold lubricant (calcium stearate) | 1 |
| Pigment (Krebs Red Lake RL-211-D) | 2 |

Such a mixture should be mixed in a mechanical mixer for about thirty minutes. It can then be milled for one minute and ten seconds at 242–250° F. and molded with a pressure of about 2,000 pounds per square inch and a cure of about eight minutes.

Mixtures of this type are substantially thermosetting, but may be made up in more or less thermoplastic forms by procedures well known in the art.

For instance, the following mixture is substantially thermoplastic:

Example III

| | Parts |
|---|---|
| Vanillyl alcohol-formaldehyde resin | 100 |
| White pine flour | 100 |
| Hexamine | 10 |
| Calcium stearate | 1 |

This thermoplastic mass may be milled for four and one-half minutes at 250° F., granulated, and then molded at 320° F. with a pressure of 2,000 pounds per square inch for a period of twelve minutes.

The resin itself, when carefully prepared, may vary in color from a light tan to a light cream color that is almost white. It will be obvious that when this light colored resin is combined with fillers and other ingredients which are substantially white or colorless, the finished articles may be made almost white, or any one of a wide variety of attractive colors, by the addition of suitable pigments. On the other hand, it will also be obvious that the advantages of the resins disclosed herein are not necessarily limited to color effects only, but may include other advantageous physical, chemical or electrical properties.

Without further elaboration the foregoing will so fully explain our invention that others may readily adapt the same for use under various conditions of service. It will, for instance, be obvious that the ratio of alcohol to formaldehyde in the example given is merely illustrative and may readily be varied, at least from three to one up to eight to one, examples being 7 to 1 and approximate proportions of about 6 parts of the alcohol to one part of the formaldehyde. Those skilled in the art will realize that the conventional use of autoclaves and higher temperatures will increase the amount of formaldehyde that may be effectively combined with a given amount of the alcohol, and that the formaldehyde may be introduced in the form of paraformaldehyde, rather than in aqueous solution.

We claim:

1. A resin formed by heat condensation in the presence of an acid catalyst, from hot vanillyl alcohol and formaldehyde in the ratio of about 7 parts of alcohol to about 1 part of formaldehyde.

2. A resin formed by heat condensation in the presence of an acid catalyst from hot vanillyl alcohol and formaldehyde; said resin being relatively light in color.

3. A resin formed by heating vanillyl alcohol and formaldehyde in the ratio of from three to eight parts of alcohol to one part of formaldehyde, in the presence of an acid catalyst.

4. A plastic article formed by heating a resin condensed from vanillyl alcohol and formaldehyde, in the approximate proportions of about six parts of the alcohol to one part of the formaldehyde.

HARRY F. LEWIS.
IRWIN A. PEARL.

REFERENCES CITED

The following references are of record in the file of this patent:

FOREIGN PATENTS

| Number | Country | Date |
|---|---|---|
| 85,588 | Germany | Feb. 13, 1896 |
| 91,369 | Austria | Feb. 26, 1923 |
| 495,133 | France | Feb. 16, 1920 |

OTHER REFERENCES

Baekeland: Ind. Eng. Chem., vol. 1, pages 149–161, Mar. 1909.

Ellis: Chemistry of Synthetic Resins, vol. 1, pages 281-2 (1935). Reinhold Pub. Co., N. Y.